United States Patent [19]

Ide

[11] 3,993,200
[45] Nov. 23, 1976

[54] CARGO TRANSPORT SYSTEM

[76] Inventor: Allan R. Ide, 10066 Bloomfield, Cypress, Calif. 90630

[22] Filed: Dec. 24, 1975

[21] Appl. No.: 644,344

[52] U.S. Cl. ................................. 214/14; 198/470; 214/1 Q; 214/91 R
[51] Int. Cl.² ........................................ B65G 67/58
[58] Field of Search ............ 214/12, 14, 15 R, 15 E, 214/91 R, 1 Q; 198/27, 79, 80

[56] References Cited
UNITED STATES PATENTS

| | | | |
|---|---|---|---|
| 2,758,703 | 8/1956 | Hampf | 198/153 |
| 3,520,396 | 7/1970 | Lingg | 214/14 X |

*Primary Examiner*—L. J. Paperner
*Assistant Examiner*—George F. Abraham
*Attorney, Agent, or Firm*—Fulwider, Patton, Rieber, Lee & Utecht

[57] ABSTRACT

A cargo transport system is provided for a vessel in which a transfer mechanism on the deck of the vessel separately transfers discrete cargo loads from a lateral conveyor on the deck of the vessel to a vertically extending conveyor system. The vertically extending conveyor system is equipped with a multiplicity of receptacles which sequentially approach the transfer mechanism. A sensing device detects the approach of a receptacle and actuates the transfer mechanism to transport one load between the lateral conveyor and the approaching receptacle. A load checking main prevents additional loads from approaching the transfer mechanism when the transfer mechanism is actuated. Releasable fastening devices at least partially entrap portions of the tower to accommodate movement of the vessel relative to the tower. Expandable and retractable conveyor systems on the deck of the vessel are interconnected to the lateral conveyor to likewise accommodate movement of the vessel relative to the tower.

12 Claims, 9 Drawing Figures

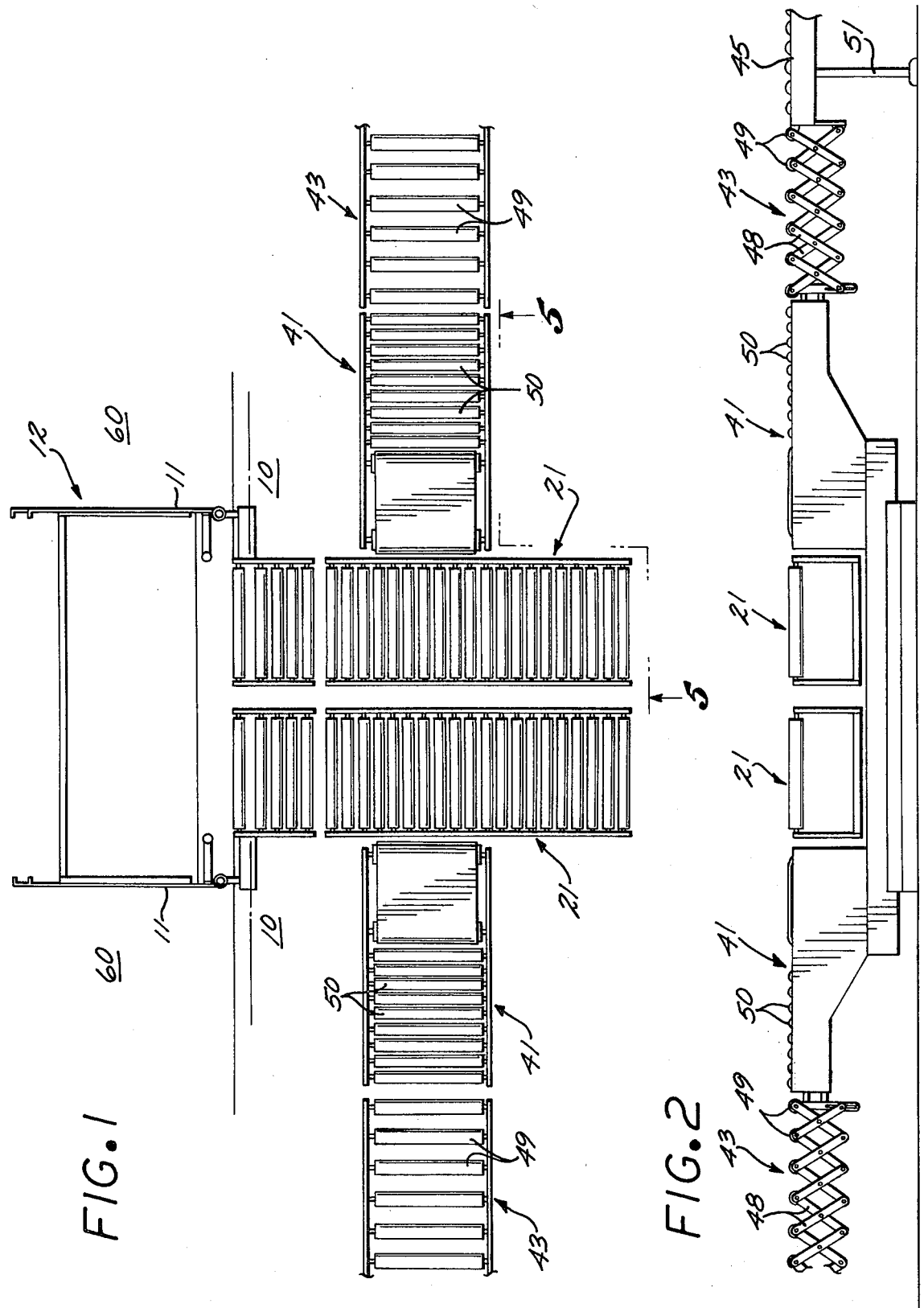

CARGO TRANSPORT SYSTEM

BACKGROUND OF THE INVENTION

In loading and unloading cargo packed in discrete and separated units from the hold of a ship, it is common practice to suspend a conveyor from a stationary boom mounted on a dock. The coneyor is extended into the hold of a ship so that workmen in the hold can load boxes, such as boxes of bananas, or other separate bundles or units of crgo, into pockets formed in the flexible material from which an endless conveyor system is constructed. An example of such a system is illustrated in U.S. Pat. No. 2,758,703.

The prior art systems involve certain problems, however. Manual loading of the boxes into the pockets formed in the flexible material frequency results in the boxes or other cargo loads being positioned askew in the pockets formed in the flexible material connected between cross bars in the endless conveyor system. This results in damage to the boxes or loads as they pass through close quarters along the conveyor route. In addition, manual loading of boxes directly into the pockets is performed with some difficulty and thus is quite time consuming. Since the receptacles formed in the flexible material of the conveyor system arrive at a loading position in the hold of the ship only at periodic intervals, the stevedores must wait for a receptacle to arrive in the appropriate position before loading a box of bananas or the like into it. Moreover, the necessary wait for a receptacle while holding a heavy box is quite fatiguing, which further reduces efficiency in discharging cargo.

SUMMARY OF THE INVENTION

It is an object of the present invention to provide a conveyor system for use in transferring discrete units of cargo between a vessel and a cargo terminal without the necessity for manually loading the individual cargo loads into receptacles in a coneyor system mounted on a loading dock. The apparatus of the present invention automatically feeds the individual cargo loads to sequentially approaching receptacles in a conveyor system leading from the cargo terminal.

A futher object of the invention is to provide a cargo handling system for use with a vessel in which all manual transfer of cargo loads is to or from a conveyor system which is capable of receiving loads at random. That is, the cargo units may be manually loaded on to a continuous conveyor line which does not include specific receptacles for units of cargo. The cargo units are then automatically transferred by the appartaus of this invention to a conveyor system which does include specific cargo receptacles.

A further object of the invention is to provide a cargo transport system extending between a vessel and a cargo terminal which accommodates movement of the vessel relative to the terminal. Cargo ships do shift both vertically and laterally with both translational and rotational motion. The fastening means by which the lateral coneyor on the vessel is connected to the vertical conveyor extending from the cargo terminal accommodates such movement. In addition, the fastening means is designed to release under excessive stress to prevent damage to the conveyor system should the vessel undergo extreme movement relative to the cargo terminal.

A further object of the invention is the provision of a means for continuous interconnection of the portion of the conveyor system on the vessel to the vessel itself and also the vertical conveyor system extending from the cargo terminal despite shifting of the vessel and its moorings. This interconnection is achieved through the use of intermediate expandable and retractable conveyor systems which include scissors linkages to increase or decrease the length of the intermediate conveyor systems.

In a broad aspect, this invention is a cargo transport system for transferring discrete cargo loads between a movable vessel and a stationary cargo terminal comprising a vertically extending conveyor tower mounted on said cargo terminal, an endless conveyor means of flexible construction having discrete receptacles formed by folds therein transversing the length of the tower, whereby each of the receptables sequentially approaches the vessel to receive a cargo load therefrom, lateral conveyor means positioned on the vessel for directing movement of the discrete cargo loads along a path terminating at the conveyor tower, transfer means positioned between the tower and the lateral conveyor means for transferring cargo loads between the receptacles and the lateral conveyor means, and receptacle sensing means for detecting an approaching receptacle and for actuating the transfer means to effect transfer of a cargo load as between the approaching receptacle and the lateral conveyor means.

BRIEF DESCRIPTION OF THE DRAWINGS

FIG. 1 is a plan view of one embodiment of the cargo transport system of this invention;

FIG. 2 is an elevational view of a portion of FIG. 1;

DESCRIPTION OF THE PREFERRED EMBODIMENTS

Figure 3:
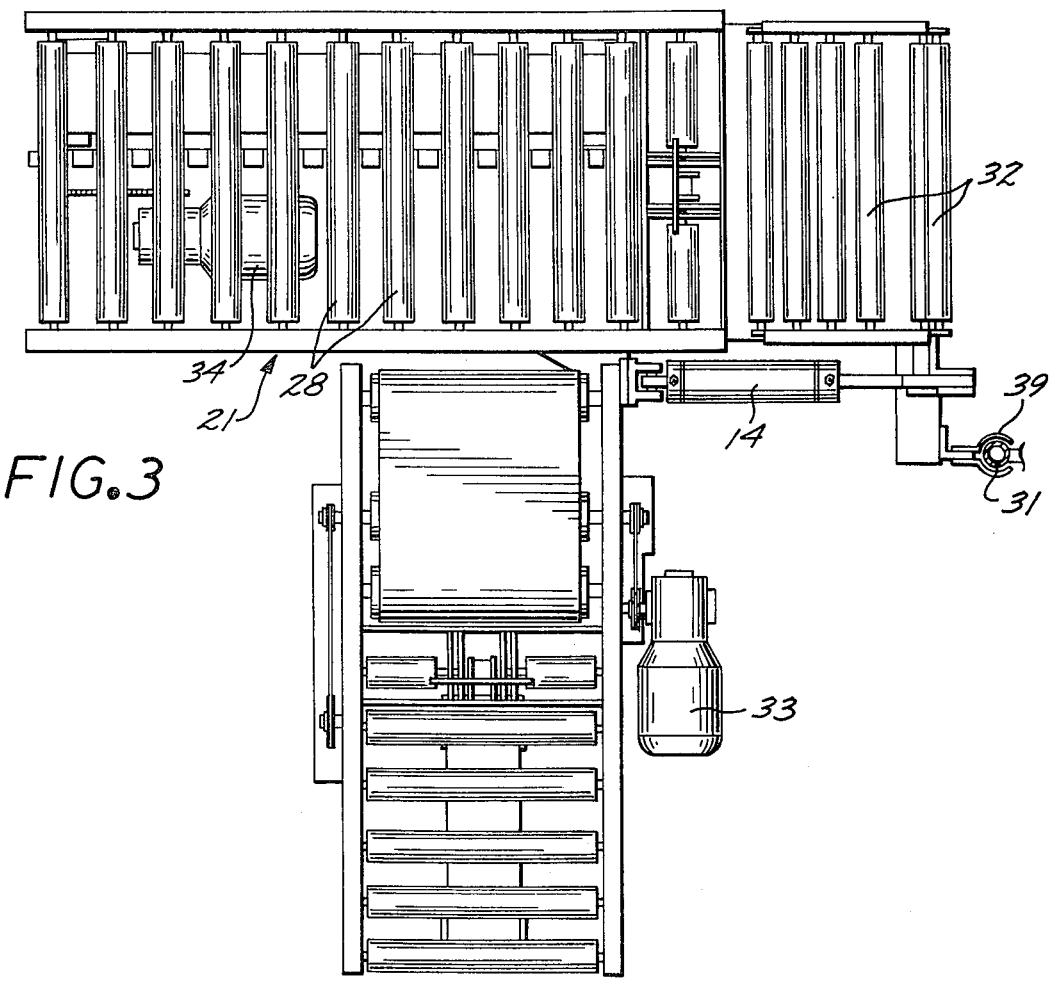
FIG. 3 is a magnified plan view of a lateral conveyor and a lateral feeder conveyor of FIG. 2.
Figure 4:
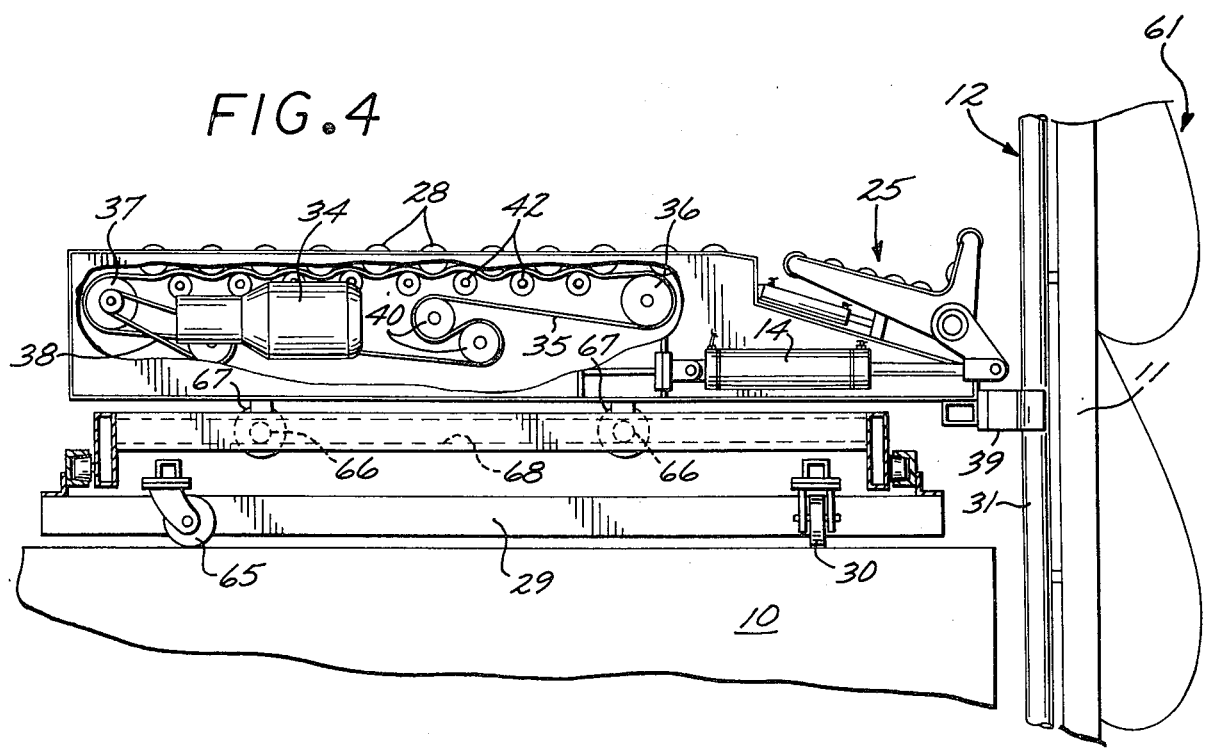
FIG. 4 is an elevational side view of the lateral conveyor of the cargo transport system with a portion of the wall thereof broken away for clarity of illustration.
Figure 8:
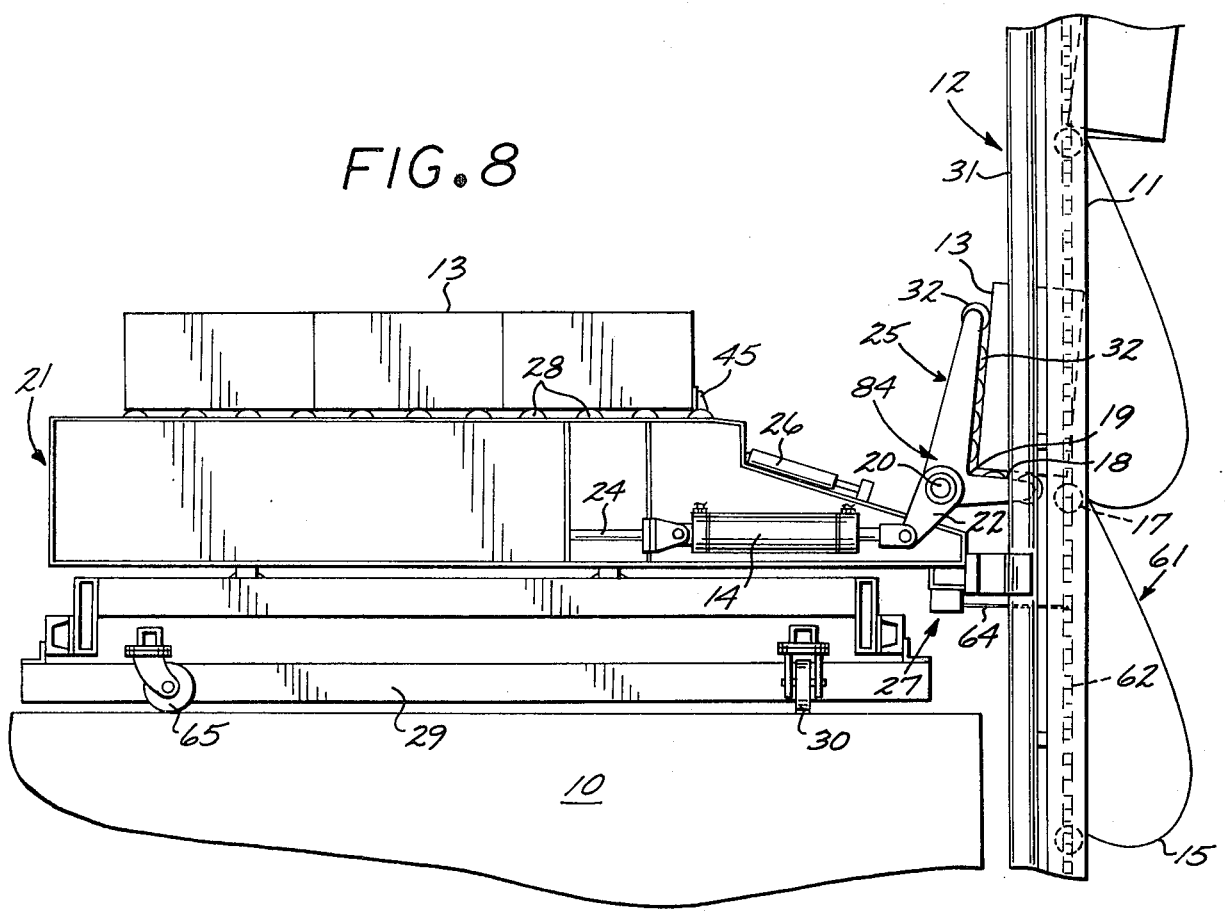
FIG. 8 illustrates the delivery of a cargo load by the transfer mechanism of this invention.
Figure 9:
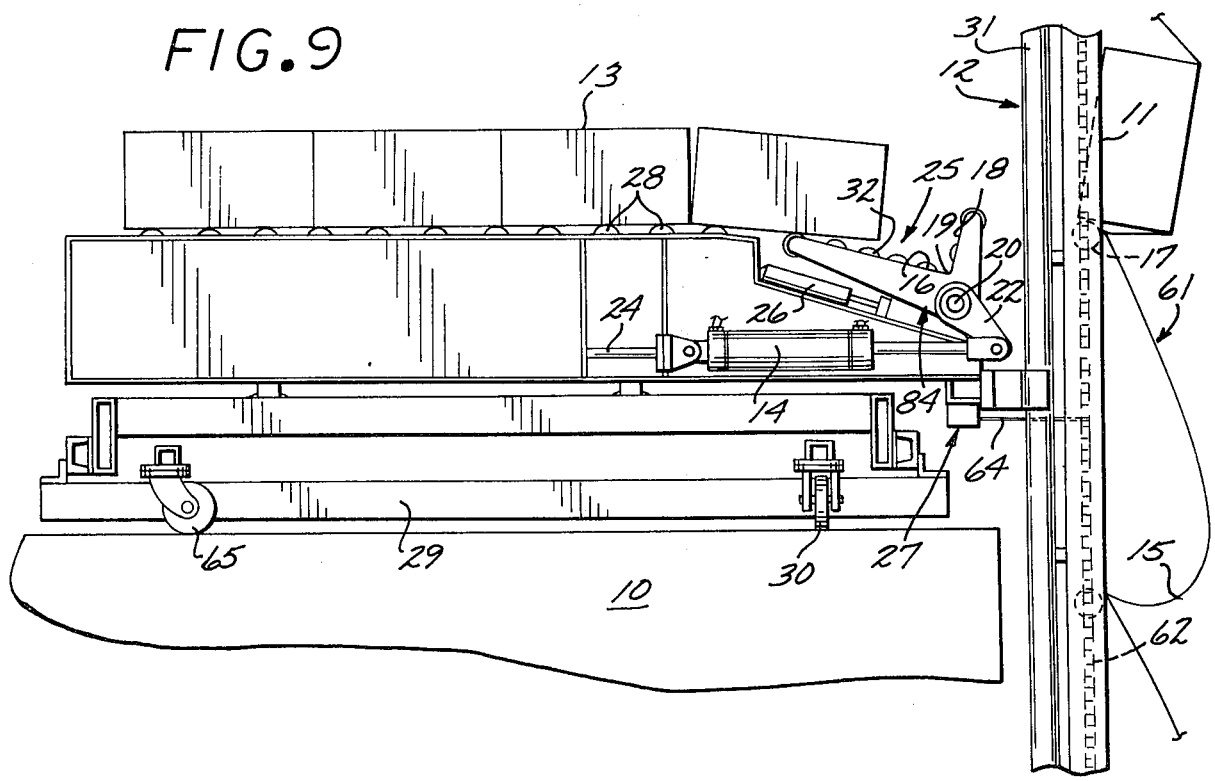
FIG. 9 illustrates the acceptance of a cargo load by the transfer mechanism of this invention.

Referring now to the drawings, FIG. 1 illustrates the deck of a vessel 10 which is moored adjacent a cargo terminal 60. The dock of the vessel 10 is vertically displaced from the cargo terminal 60 so that a vertically extending support 12 is secured to the cargo terminal 60 and extends beyond the level of the deck of the vessel 10 as illustrated in FIGS. 4, 8 and 9. The vertically extending conveyor tower 12, which is mounted on the cargo terminal 60, has upright stanchions 11 that include guide rails 31. An endless tower conveyor means 61 of flexible construction and preferably formed of a very heavy fabric, travels between the upright stanchions 11 of the vertically extending conveyor tower 12. The endless conveyor 61 also includes a plurality of rigid bars 17 that extend between the stanchions 11 and are constrained to move lengthwise with respect to stanchions 11 by virtue of parallel chains 62 which interconnect bars 17 and limit the maximum separation between the bars 17. The fabric of the endless conveyor is looped around and secured to each of the bars 17. Sufficient fabric is provided between the bars 17 so that pockets or receptacles 15 are formed by folds in the fabric between each pair of sequential bars 17. The bar 17 adjacent the lower portion of each receptacle 15 may thereby be considered to be associated with that receptacle. In this manner, each of the bars 17 is associated with a single one of the receptacle 15. The receptacle 15 and the bars 17 are constrained by the tower 12 to travel in an endless inflexible and generally vertical path traversing the length of the tower 12. During operation of the endless conveyor 61, each of the receptacles 15 sequentially approaches the loading area of the vessel 10 to receive a cargo load 13 therefrom.

On the deck of the vessel 10 lateral conveyors 21 are positioned for directing movement of the discrete and separate cargo loads 13 along a path athwartship across the deck of the vessel 10 and terminating at the conveyor tower 12. While two lateral conveyors 21 are depicted in FIGS. 1 and 2 and are provided to double the cargo handling capacity of the cargo transport system, the operation of only one of the lateral conveyors 21 will be considered in the further explanation of the invention, as the operation of the other conveyor 21 will be identical.

Figure 6:
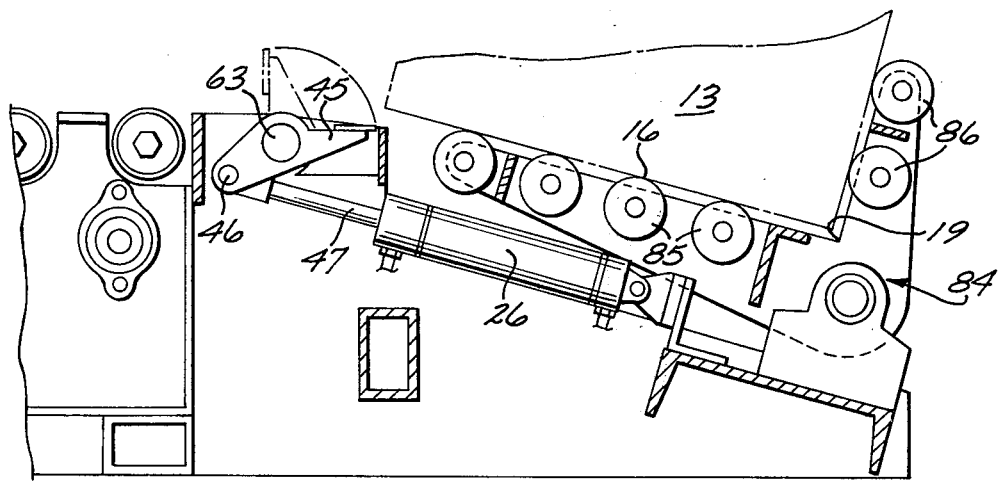
FIG. 6 is an enlarged sectional view taken along the lines 6—6 of FIG. 3 showing the transfer mechanism.
Figure 7:
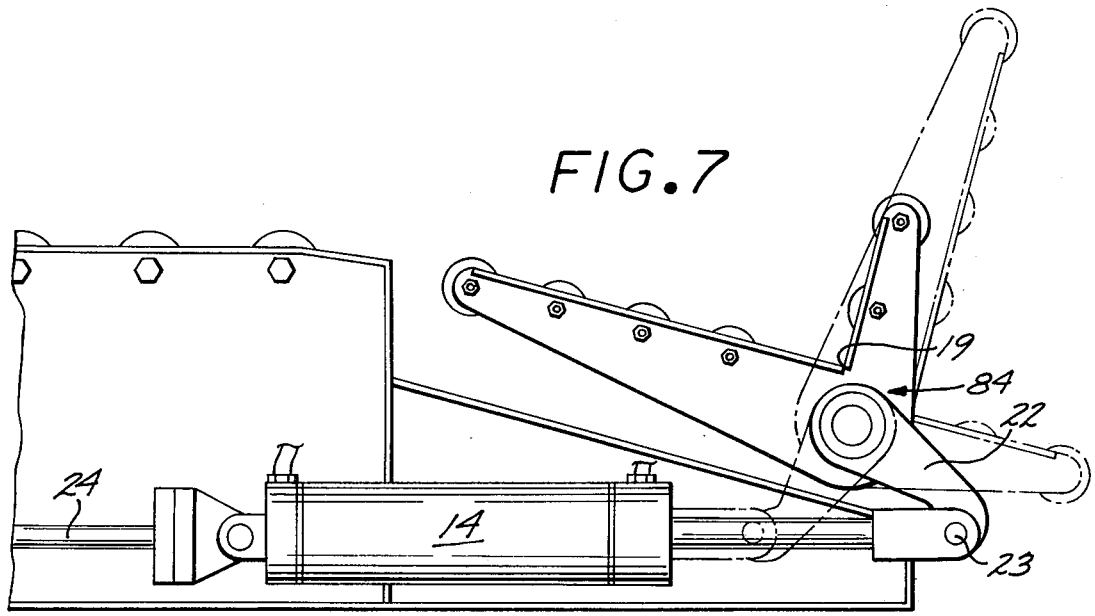
FIG. 7 is an elevational view taken along the lines 7—7 of FIG. 3 and illustrates the transfer mechanism of FIG. 6 in the load acceptance position in solid lines and the load delivery position in dashed lines.

At the location at which the generally horizontal path of cargo movement defined by the lateral conveyor 21 intersects the generally vertical path of movement defined by the endless conveyor 61, an automatic load transfer system 25 is provided for individually moving separate cargo loads 13 between the lateral conveyor 21 and the receptacles 15 to effectuate transpositioning of the separate loads 13 between the generally horizontal path and the generally vertical path previously described. The cargo transfer mechanism 25 is illustrated in detail in FIGS. 4, 6 and 7, and is comprised of a member 84 which is rotatable about an axis 20 and which has cargo supporting surfaces 16 and 18 which supporting surfaces intersect in a line 19 parallel to the axis of rotation 20 and generally perpendicular to the direction of cargo load movement both on the lateral conveyor 21 and in the receptacles 15 on endless conveyor 61. The member 84 of the transfer mechanism 25, which includes supporting surfaces 16 and 18, is rotatable about the axis 20 between a cargo load acceptance position, as indicated in solid lines in FIG. 7 and a cargo load delivery position, as indicated in dashed lines in FIG. 7. The transfer mechanism 25 further includes a power element 14 in the form of an electrially actuated pneumatic cylinder, which acts upon a crank arm 22 through a pivot 23 to move the member 84 between the cargo load acceptance and load delivery positions. The power element 14 is secured to the lateral conveyor 21 by a connecting link 24.

A sensing devie 27 is interconnected between the power element 14 and the tower 12 to actuate the power element 14 upon the approach of a receptacle 15. Upon actuation, the transfer device 25 transports the load 13 between the lateral conveyor 21 and the approaching receptacle 15. The sensing mechanism 22 includes a feeler wand 64 movable between dormant and actuating positions and biased into the dormant position where it intrudes into the inflexible path of the endless conveyor 61 on the tower 12.

The transfer mechanism 25, when in the cargo load acceptance position of FIG. 9, is displaced vertically downward from the lateral conveyor 21, whereby acceptance of the loads by the transfer mechanism 25 being assisted by the force of gravity.

The arm of the member 84, which together with rollers 85 defines the supporting Surface 16, transfer mechanism 25 is of a length such that it accommodates only a single cargo load 13 at any one time. when it is in a load acceptance position as indicated in FIG. 9, the transfer mechanism 25 will accept only one cargo load 13.

As a receptacle 15 approaches the loading area of the vessel 10, its associated cross bar 17 forces the feeler wand 64 of the sensing element 27 out of the path of the conveyor system 61 into an actuating position. This closes an electrical contact within the receptacle sensing means 27 to actuate the pneumatic cylinder 14 to move the transfer means 25 from the cargo load acceptance position of FIG. 9 to the load delivery position of FIG. 8. In this way, the cargo loads 13 are sequentially delivered to the receptacles 15 as the receptacles 15 arrive at the terminal loading area of vessel 10 in seriatim order.

The lateral conveyor 21 further includes a load checking means 45 which is actuated by the feeler wand 64 of the receptacle sensor 27. The operation of the load checking means 45 is illustrated FIG. 6. In addition to providing an electrical signal to the power element 14, the feeler switch 64 provides an electrical signal to pneumatic cylinder 26 which retracts the piston arm 47 from the position indicated in solid lines in FIG. 6. The piston arm 47 acts through the pivot 46 to turn the load checking device 45 about an axis 63 in a counterclockwise direction to bring the element 45 into an upright position where it prevents loads 13 from approaching the transfer means 25 when the switch 64 of the sensing element 27 is in the actuating position. This prevents the movement of a load 13 toward the transfer mechanism 25 while the transfer mechanism 25 is actuated, as illustrated in FIG. 8.

The lateral conveyors 21 are mounted upon a platform 29 which in turn rides on the deck of the vessel 10 on casters 30 and 65. A connecting means between the platform 29 and the conveyors 21 supports the conveyors 21 and allows longitudinal movement of the conveyors 21 relative to the platform 29 generally toward and away from the tower 12, as illustrated in FIG. 4. This connecting means includes rollers 66 which depend from the lateral conveyor 21 to ride in tracks 68 mounted on the platform 29. The rollers 66 are backed by discs 67 to hold the rollers 66 in the tracks 68. In this manner the lateral conveyors 21 are able to move longitudinally with respect to the platforms 29, but are restrained from transverse movement relative to the platform 29. It should be kept in mind that while movement of the lateral conveyors 21 is longitudinal relative to the platform 29, this allowable motion is, athwartship rather than from stem to stern.

The casters 30 can move only lengthwise with respect to the vessel 10, while the casters 65 are pivotable to accommodate both translational and rotational motion of the rear of the platform 29 relative to the deck of the vessel 10.

FIG. 4 also illustrates the driving mechanism of the lateral conveyor 21. An electric motor 34 powers a drive belt 38 that acts upon a driving roller 37. Roller 37 holds a belt 35 to drive over the idler follers 42 and around a main roller 36 at the opposite end of the lateral conveyor 21. This turns the bearing rollers 28 in a clockwise direction to propel cargo loads 13 toward the transfer means 25. Slack adjustment rollers 40 are provided to accommodate flexing of the belt 35.

The lateral conveyor 21 also includes laterally extending releasable fasteners 39 which partially encircle the rails 31 of the upright stanchions 11. The fasteners 39 are slideably movable lengthwise along the rails 31 and accommodate some rotational motion of the lateral conveyors 21 relative to the conveyor tower 12.

It can be seen that by virtue of the fasteners 31, the interconnection between the lateral conveyors 21 and platform 29, and the casters 30 and 65 supporting platform 29, that the cargo transport system of this invention can accommodate some movement of the vessel 10 relative to the stationary loading dock 60. The conveyors 21 are thereby drawn to and fro athwartship and fore and aft when the vessel 10 shifts in its mooring, but will release from the tower 12 thus preventing any damage to the cargo transport system in the event that the vessel 10 accidently becomes unmoored.

Figure 5:
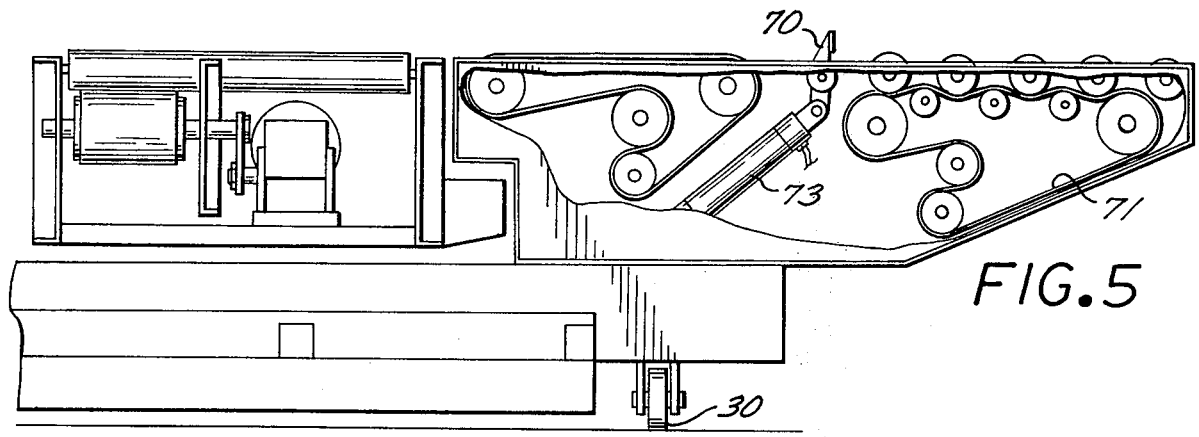
FIG. 5 is a view taken along the lines 5—5 of FIG. 1 with a wall portion broken away for the sake of clarity.

In the embodiment of the invention depicted, the cargo transport system is additionally comprised of transverse feeder conveyors 41 connected to the lateral conveyors 21 for effecting movement of the discrete cargo loads 13 in directions perpendicular to the alignment of the lateral conveyors 21. The feeder conveyors 41 are powered in a manner similar to the lateral conveyor 21, as illustrated in FIG. 5. A belt 71 is driven by a motor to turn the rollers 72 to propel loads 13 toward the lateral conveyors 21. A stopping mechanism 70 actuated by pneumatic cylinder 73 is also provided. Pneumatic cylinder 73 may be actuated by the receptacle sensor 27 in the same manner as is the pneumatic cylinder 26. Thus cargo loads 13 are not forced onto the lateral conveyors 21 when the transfer mechanism 25 is in the cargo delivery position. This prevents a load pile-up on the lateral conveyors 21.

The cargo transport system also includes expandable and retractable conveyor systems 43 which are connected to and serve as extensions of the transverse feeder conveyors 41. The conveyors systems 43 include scissors linkages 48 which are connected both to the feeder conveyors 41 and to the vessel 10 through the vessel's conveyor systems 45 which are secured in position on the deck of the vessel by upright standards 51. The rollers 49 of the expandable and retractable conveyor systems 41 allow loads to be transferred from the vessel conveyor systems 45 to the feeder conveyor systems 41. The accordion-like action of the scissor linkages 48 accommodates the relative rotational motion of the vessel 10 with respect to the tower 12 when the vessel tends to shift at its moorings. The expandable and retractable conveyor systems 43 typically cannot exceed about 10 feet in length when in the expanded condition, unless intermediate supports terminating in wheels or casters riding on the deck of the vessel 10 are provided. In any event, the opposite ends of each conveyor system 43 are secured to a lateral feeder conveyor 41 and to the vessel 10 at a distance from the lateral feeder conveyor.

While but a single embodiment of the invention has been depicted, it is to be understood that numerous variations and modifications will become apparent in view of the disclosure herein. For example, the embodiment depicted is adapted for off-loading of cargo, but it can be seen that the cargo transport system of this invention could be used for loading of cargo onto a vessel as well as unloading cargo therefrom. The foregoing detailed description is therefore for purpose of illustration only, and no unnecessary limitations should be construed therefrom, as the invention is defined in the claims appended hereto.

I claim:
1. A cargo transport system for transferring discrete cargo loads between a movable vessel and a stationary cargo terminal and comprising:
   a vertically extending conveyor tower mounted on said cargo terminal;
   an endless conveyor means formed with discrete receptacles transversing the length of said tower, so each of said receptacles sequentially approaches said vessel to receive a cargo load therefrom;
   lateral conveyor means positioned on said vessel for directing movement of said discrete cargo loads along a path terminating at said conveyor tower;
   transfer means positioned between said tower and said lateral conveyor means for transferring cargo loads between said receptacles and said lateral conveyor means; and
   receptacle sensing means for detecting an approaching receptacle and for actuating said transfer means to effect the transfer of a cargo load as between said approaching receptacle and said lateral conveyor means whereby said cargo loads are automatically moved along said lateral conveyor to be sequentially loaded in said receptacles for conveyance along said tower.

2. The cargo transport system of claim 1 wherein:
   said transfer means includes a member rotatable about an axis and having cargo supporting surfaces which intersect in a line parallel to said axis and generally perpendicular to the direction of cargo load movement both on said lateral conveyor and in said receptacles on said endless conveyor means, and said member is rotatable about said axis between a cargo load acceptance position and a cargo delivery position, and further comprising a power element for moving said member between said cargo load acceptance and load delivery positions, and said sensing means is interconnected between said power element and said tower means to actuate said power element upon the approach of a receptacle.

3. The cargo transport system of claim 1 wherein:
   said power element is an electrically actuated pneumatic cylinder.

4. The cargo transport system of claim 2 wherein:
   said endless conveyor means further comprises a plurality of rigid structures each associated with a single receptacle and connected to said conveyor means and constrained by said tower to travel in an endless inflexible path with respect thereto, and said sensing means includes a switch movable between dormant and actuating positions and biased into a dormant position that intrudes into said inflexible path, whereby said rigid structures sequentially force said switch out of said inflexible path into an actuating positon as the receptacle associated therewith approaches said transfer means.

5. The cargo transport system of claim 4 wherein:
   said lateral conveyor means further comprises load checking means actuable by said switch to prevent loads from approaching said transfer means when said sensing means is in the actuating position.

6. The cargo transport system of claim 1 wherein:
said conveyor tower is comprised of upright stanchions between which said endless conveyor means travels, and said lateral conveyor means is comprised of laterally extending releasable fastening means which at least partially entrap said upright stanchions and which are slideably movable lengthwise relative thereto and which constrain said lateral conveyor means to rotational movement relative to said conveyor tower.

7. The cargo transport system of claim 6 wherein:
said lateral conveyor means is mounted upon a platform riding on casters and connecting means and allows longitudinal movement of said lateral conveyor means relative to said platform generally towards and away from said conveyor tower and restrains transverse movement of said lateral conveyor means relative to said platform.

8. The cargo transport system of claim 7 that includes:
transverse feeder conveyors connected to said lateral feeder conveyors for effecting movement of said discrete cargo loads in directions perpendicular to the alignment of said lateral conveyor means, and expandable and retractable conveyor systems are connected to and serve as extensions of said transverse feeder conveyors.

9. The cargo transport system of claim 8 wherein:
said expandable and retractable conveyor systems includes scissors linkages connected to said lateral feeder conveyors and secured to said vessel to effectuate expansion and retraction.

10. A cargo transport system for use in transferring a multiplicity of separate and discrete loads between a cargo terminal and a loading area of a vessel vertically displaced therefrom comprising:

a vertically extending support secured to said cargo terminal and having an endless conveyor system with separate receptacles therein traveling the length thereof whereby each of said receptacles approaches the loading area of said vessel along a generally vertical path in seriatim order;

a lateral conveyor means positioned in the loading area of said vessel to carry said discrete loads along a generally horizontal path that intersects said generally vertical path;

a load transfer mechanism for individually moving said separate loads between said lateral conveyor means and said receptacles to effectuate transpositioning of said separate loads between said generally horizontal path and said generally vertical path;

and receptacle sensing means associated with said lateral conveyor means for detecting the approach of a receptacle toward said loading area of said vessel and for actuating said transfer mechanism to transfer a load between said lateral conveyor means and said approaching receptacle.

11. The cargo transport system of claim 10 that includes:
a loading checking means associated with said lateral conveyor means and responsive to said receptacle sensing means to prevent the movement of a load to said transfer mechanism while said transfer mechanism is actuated.

12. The cargo transport system of claim 11 wherein:
said transfer mechanism is displaced vertically downward from said lateral conveyor means to accept loads from said lateral conveyor, whereby acceptance of a load by said transfer mechanism from said lateral conveyor means is assisted by the force of gravity.

* * * * *